Sept. 16, 1952 J. L. ARENDS 2,611,083
SUPERHETERODYNE RECEIVER
Filed Oct. 7, 1949
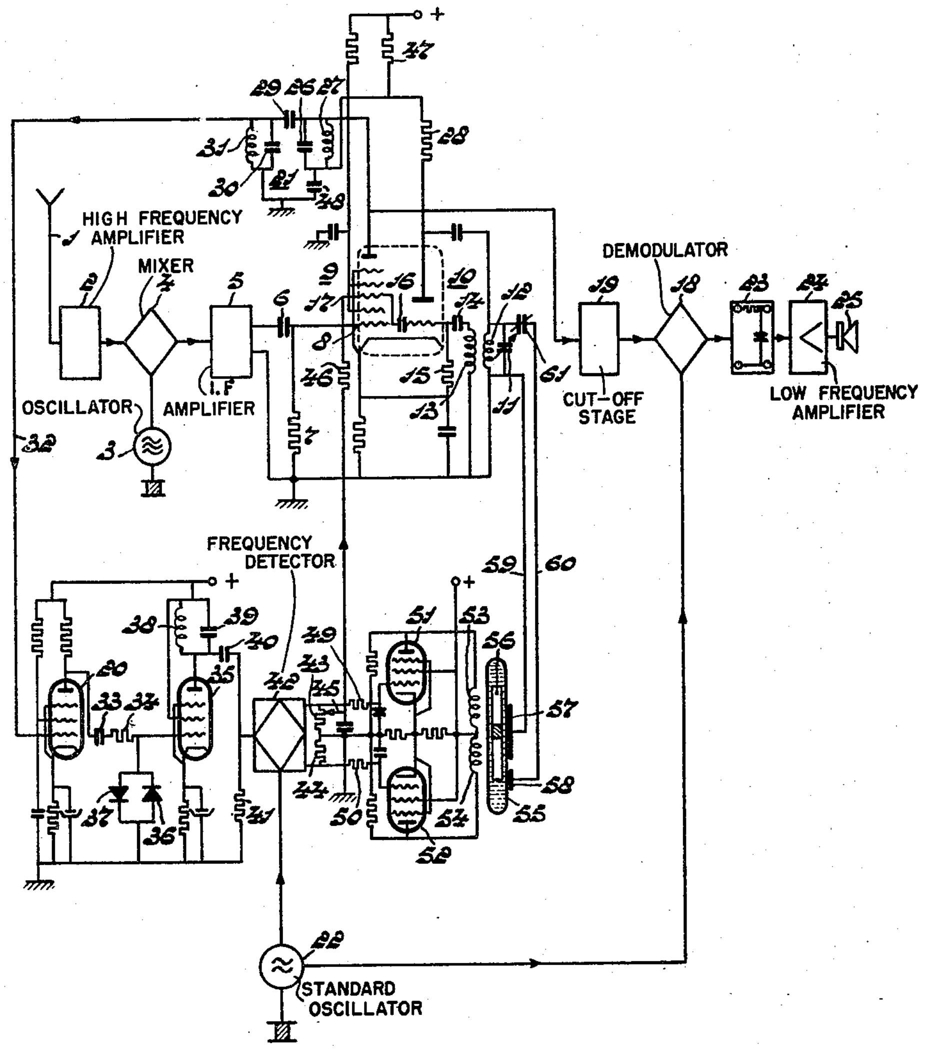
INVENTOR.
JACOBUS LUDOVICUS ARENDS
BY Fred M. Vogel
AGENT Patented Sept. 16, 1952 2,611,083

UNITED STATES PATENT OFFICE 2,611,083

SUPERHETERODYNE RECEIVER

Jacobus Ludovicus Arends, Hilversum, Netherlands, assignor to Hartford National Bank and Trust Company, Hartford, Conn., trustee Application October 7, 1949, Serial No. 120,143
In the Netherlands October 8, 1948

6 Claims. (Cl. 250—20)

This invention relates to superheterodyne receivers having automatic frequency correction of the local oscillator and may be applied with particular advantages to receivers intended for the reception of single side-band signals having a pilot frequency modulation component.

In superheterodyne receivers for automatic frequency correction, it is known to connect an amplifying tube, operating as a variable reactance, parallel to the frequency-determining circuit of a local oscillator, said amplifying tube having supplied to it, as an AFC voltage, a control voltage derived from a frequency detector connected, for example, to the intermediate-frequency amplifier.

Such an AFC arrangement has the advantages of rapid control, high electrical sensitivity and low sensitivity to mechanical vibration, but has the disadvantage of a so called "back setting force" of frequency drift that is to say, the frequency tends to return to the uncorrected value when the control voltage is lost due, for example, to fading of the incoming signal. Furthermore, such arrangements in practice permit of covering only a very limited control range.

It is furthermore known for AFC purposes to control the sense of rotation of an electric motor which adjust the value of an impedance connected parallel to the frequency-determining circuit of the oscillator according to the polarity of the control voltage. An advantage of such a mechanical control is the absence of the drift referred to, since the motor stops as soon as the required frequency correction is carried out and remains at rest when the control voltage is lost, so that the corrected frequency remains at the value to which it was last adjusted. A further advantage is the comparatively large control range that may be obtained. However, this control is subject to mechanical inertia and hence is slow in action, and also the electrical sensitivity is low.

The combined use of the two above-described control systems results in an AFC circuit which provided an advantageous compromise with regard to speed of control, control sensitivity, control range, absence of the said drift and insensitivity to mechanical vibration.

According to the present invention a superheterodyne receiver comprises a grid-controlled mixing-tube and a local oscillator having a back-coupled grid-controlled electronic tube, of which at least the control grid and the anode do not form part of the mixing-tube system and in which the local oscillator signal and the incoming signal are supplied to the mixing tube and the intermediate-frequency oscillations derived therefrom control an intermediate-frequency amplifier, this receiver comprising simple means by which the local oscillator is automatically corrected in frequency with the use of a direct AFC control voltage derived from a frequency detector connected to the intermediate-frequency amplifier. The AFC voltage is supplied to a control grid of the mixing tube system which operates as a direct-voltage amplifier for the AFC voltage, whilst the anode circuits of the mixing and oscillator tube systems, which are otherwise separated, include a common direct-current resistance across which appears the amplified AFC voltage supplied to the oscillator anode for the purpose of frequency correction.

The use of the mixing tube system as a direct-voltage amplifier for the AFC voltage results in a comparatively high sensitivity with a reasonable control range, whilst disturbing couplings may be avoided in a very simple manner, viz by shunting the common ohmic resistance for high-frequency, intermediate-frequency and oscillator frequency by means of a condenser.

The variation in the direct current position of the mixing tube system produced as a result of the AFC control voltage supplied to a control grid of the mixing tube system may give rise to unwanted variation in the conversion slope of the mixing tube system and to distortion.

According to one form of the invention these difficulties are obviated by coupling the frequency-determining circuit of the oscillator to a frequency corrector which preferably operates without the said drift and which comprises a control member which is moved mechanically (and hence comparatively slowly) upon occurrence of an AFC voltage.

It is thus ensured that frequency corrections occurring may give rise to unwanted variation in the conversion slope of the mixing tube system and to distortion for a short period only, since the frequency correction of the immediately operating electronic control will be gradually taken over by the mechanical frequency corrector until the electronic frequency corrector is fully released and hence unwanted variation in the direct-current position of the mixing tube system no longer occurs.

In order that the invention may be readily carried into effect, one example will now be described more fully by reference to the accompanying drawing, which shows a superheterodyne receiver suitable for the reception of single side-band signals.

The single side-band signal with suppressed carrier wave is received by an aerial 1 and is assumed to comprise a 10 kc./sec. pilot frequency in addition to the intelligence signals. The pilot frequency constitutes a modulation component which may lie either within or without the frequency band constituted by the intelligence signals. This signal is supplied, after amplification in a high-frequency amplifier 2, together with the oscillator signal from a first crystal-controlled local oscillator 3, to a first mixing stage 4.

The intermediate-frequency signal of 500 to 496 kc./sec. obtained after mixing contains the frequency of 500 kc./sec. which represents the 10 kc./sec. pilot frequency modulation component. This I. F. signal is amplified in an intermediate-frequency amplifier 5 and the output is supplied through a grid condenser 6 and a leak resistance 7 to a first control grid 8 of a hexode 9 serving as a mixing tube. The local oscillator which is automatically corrected in frequency has a triode 10 with anode resistance 28, which triode may, if desired, be incorporated together with the hexode 9 in one bulb and the anode circuit of which furthermore includes the oscillatory circuit determining the oscillatory frequency and constituted by a condenser 11 and an inductance 12. The oscillations generated are back-coupled through a feed-back coil 13 included in the grid circuit of the triode 10 and supplied through a grid condenser 14 and a leak resistance 15 to the control grid of triode 10, which control grid is coupled via a condenser 16 to a third grid 17 of the hexode 9. The single side-band signal produced in the anode circuit of the hexode and extending, after the twofold transposition to which it has been subjected, through a range of frequencies of 10 to 6 kc./sec. in this example, is supplied for the purpose of separating the intelligence signals and the pilot frequency to a demodulator 18 through a cut-off stage 19 and to an amplifying tube 20 through a band-pass filter 21 included in the anode circuit of the hexode 9.

A local oscillator signal originating from a standard oscillator 22 having a 10 kc./sec. crystal is supplied to the demodulator 18 and the low-frequency signals (0 to 4 kc./sec.) produced in the output circuit of the demodulator 18 are supplied through a low-pass filter 23 and a low-frequency amplifier 24 to a reproducing device 25 which is connected thereto.

The band-pass filter 21 included in the anode circuit of the hexode 9 comprises a first parallel circuit including a condenser 26 and an inductance 27. That extremity of this parallel circuit which is remote from the anode of the hexode is connected through a resistance 47 to the anode lead, the other end of the parallel circuit being connected through a condenser 29 to one end of a second parallel circuit comprising a condenser 30 and an inductance 31 and through a lead 32 to the control grid of the amplifying tube 20. The other end of the second parallel circuit is connected to earth. The pilot signal passed by the band-pass filter 21 and amplified in the anode circuit of the amplifying tube 20 is supplied by way of a blocking condenser 33 and a series-resistance 34 to a bilateral limiter formed by two rectifiers 36 and 37 connected in parallel opposition and included in the control-grid circuit of an amplifying tube 35.

The pilot signal thus limited is selected, after having been amplified in the anode circuit of amplifying tube 35, by a tuned circuit comprising a coil 38 and a condenser 39, whereupon the pilot signal is supplied by way of a coupling condenser 40 and an output resistance 41 to a frequency detector 42 in order to be compared with the comparative signal produced by the standard oscillator 22.

The frequency detector 42 supplies a control voltage which corresponds to the polarity and value of the frequency or phase difference between pilot frequency and comparative signal and which is developed at push-pull output resistances 43 and 44. Frequency detector 42 may be constituted by any of a variety of known mixing detector circuits. A suitable circuit is shown, for example, in an article by L. I. Farren in "Wireless Engineer," vol. 23 (1946), pages 330 to 340 and in particular Fig. 6 thereof. The output resistance 43 is constructed as a potentiometer and the AFC control voltage which appears at a sliding contact 45 is supplied by way of a resistance 46 to the third grid 17 of the mixing hexode 9 which operates as a direct-voltage amplifier for the control voltage.

By connecting those ends of the output impedances 27 and 28 of the mixing hexode 9 and the oscillator triode 10 which are remote from the anodes of the said tubes through a common ohmic resistance 47 to the positive terminal of the anode voltage supply, the variation in anode voltage produced in the anode circuit of the hexode due to a variation in the control voltage at the third grid 17 results in a variation in the anode voltage of the oscillator and hence a variation in the frequency of the local oscillator. In order to avoid disturbing couplings, the common resistance 47 is short-circuited for oscillator and intermediate-frequency oscillations by means of a condenser 48.

The positive or negative control voltage set up at the output resistances 43 and 44 of the frequency detector 42 is supplied through resistances 49 and 50 respectively to the control grids of two push-pull amplifying tubes 51, 52, both of which are just cut-off in the absence of a direct control-voltage. According to the polarity of the AFC control-voltage, one or other of the push-pull amplifying tubes becomes conductive and energizes the corresponding energizing coil 53 or 54 of a variable reactance 55 included in the anode circuits of the said tubes.

The variable reactance 55 comprises a control member (piston) 56, which is movable in a tube under the action of the energizing coils 53, 54 and which constitutes in this example, a capacitive blind electrode, said control member co-operating electrically with cylindrical coatings 57, 58, which are cemented on the wall of the tube and which, as shown diagrammatically in the drawing are connected through a lead 59 to the earthed end and, through a trimmer condenser 61 included in a lead 60, to the other end of the frequency-determining oscillatory circuit 11, 12 of the local oscillator triode 10.

Upon the occurrence of a maintained frequency variation of the incoming signal, the AFC control voltage appearing at the sliding contact 45 in the output circuit of the frequency detector 42 results in a variation in the biasing potential of the third grid 17 of the mixing hexode and, as previously explained, bring about a correction of the local oscillator frequency. However, this variation in the direct-current position of the mixing tube also gives rise to unwanted variation in the conversion slope of the mixing tube and hence to distortion of the incoming signal.

The disadvantages referred to which are inherent in the above described electronic control are minimised by providing in addition to the particularly simple and inertialess electronic control described, a mechanical and slowly acting frequency correction of the local oscillator frequency, so that the duration of distortion and the like is limited to the period of operation of the mechanical control. The mechanical control gradually takes over the frequency correction of the electronic control until the latter is released almost completely, thereby eliminating the initial variation in the direct-current position of the mixing tube.

What I claim is:

1. A superheterodyne receiver circuit arrangement, comprising a first electron discharge system having input and output circuit means, means to apply a received signal wave to the input circuit means of said first discharge system, a second electron discharge system having input and output circuit means, a resistance element interposed in both the output circuit means of said first and second discharge systems, means intercoupling the output and input circuit means of said second discharge system in regenerative relationship to produce a source of local oscillation, said source undergoing changes in the frequency thereof proportional to changes in potential applied to the said output circuit means thereof, means to apply said local oscillation to the input circuit means of said first discharge system to mix said received signal wave and said local oscillation thereby to produce in the output circuit means of said first discharge system an intermediate frequency wave having a given frequency, a detector stage responsive to said intermediate frequency wave coupled to said output circuit means of said first electron discharge system, means to derive from said detector stage a direct control voltage proportional to variations in frequency of said intermediate frequency wave from said given frequency, and means to apply said control voltage to the input circuit means of said first discharge system to produce across said resistance element an amplified control voltage and to thereby apply said amplified control voltage to the output circuit means of said second discharge system to vary the frequency of said source in a direction suppressing said variations in frequency of said intermediate frequency wave from said given frequency.

2. A superheterodyne receiver circuit arrangement, comprising a first electron discharge system having a cathode element, first and second control grids and an anode, means to apply a received signal wave to one of the control grids of said first discharge system, a second electron discharge system having a cathode element, a control grid and an anode, first and second output circuits each coupled to a respective one of said anodes, a resistance element interposed in both said output circuits, means intercoupling the anode and control grid of said second discharge system in regenerative relationship to produce a source of local oscillation, said source undergoing changes in the frequency thereof proportional to changes in potential applied to the anode of said second discharge system, means to apply said local oscillation to the other control grid of said first discharge system to mix said received signal wave and said local oscillation thereby to produce in the output circuit coupled to the anode of said first discharge system an intermediate frequency wave having a given frequency, a detector stage responsive to said intermediate frequency wave coupled to said output circuit coupled to the anode of said first electron discharge system, means to derive from said detector stage a direct control voltage proportional to variations in frequency of said intermediate frequency wave from said given frequency, means to apply said control voltage to one of the control grids of said first discharge system to produce across said resistance element an amplified control voltage and to thereby apply said amplified control voltage to the anode of said second discharge system to vary the frequency of said source in a direction suppressing said variations in frequency of said intermediate frequency wave from said given frequency.

3. A superheterodyne receiver circuit arrangement, comprising a first electron discharge system having a cathode element, first and second control grids and an anode, means to apply a received signal wave to one of the control grids of said first discharge system, a second electron discharge system having a cathode element, a control grid and an anode, first and second output impedance elements each having one end thereof coupled to a respective one of said anodes, a resistance element intercoupling the other ends of said impedance elements and a source of operating potential, means intercoupling the anode and control grid of said second discharge system in regenerative relationship to produce a source of local oscillation, said source undergoing changes in the frequency thereof proportional to changes in potential applied to the anode of said second discharge system, means to apply said local oscillation to the other control grid of said first discharge system to mix said received signal wave and said local oscillation thereby to produce in the output circuit coupled to the anode of said first discharge system an intermediate frequency wave having a given frequency, a detector stage responsive to said intermediate frequency wave coupled to said output circuit coupled to the anode of said first electron discharge system, means to derive from said detector stage a direct control voltage proportional to variations in frequency of said intermediate frequency wave from said given frequency, means to apply said control voltage to one of the control grids of said first discharge system to produce across said resistance element an amplified control voltage and to thereby apply said amplified control voltage to the anode of said second discharge system to vary the frequency of said source in a direction suppressing said variations in frequency of said intermediate frequency wave from said given frequency.

4. A superheterodyne receiver circuit arrangement, comprising a first electron discharge system having a cathode element, first and second control grids and an anode, means to apply a received signal wave to said first control grid of said first discharge system, a second electron discharge system having a cathode element, a control grid and an anode, each of said discharge systems being included in the same envelope, first and second output circuits each coupled to a respective one of said anodes, a resistance element interposed in both said output circuits, means intercoupling the anode and control grid of said second discharge system in regenerative relationship to produce a source of local oscillation, said source undergoing changes in the frequency thereof proportional to changes in potential applied to the anode of said second discharge system, means to apply said local oscillation to said second control grid of said first discharge system to mix said received signal wave and said local oscillation thereby to produce in the output circuit coupled to the anode of said first discharge system an intermediate frequency wave having a given frequency, a frequency detector stage responsive to said intermediate frequency wave, an intermediate frequency amplifier intercoupling the output circuit coupled to the anode of said first discharge system and said frequency detector stage, means to derive from said frequency detector stage a direct control voltage proportional to variations in frequency of said intermediate frequency wave from said given frequency, means to apply said control voltage to said second control grid of said first discharge system to produce across said resistance element an amplified control voltage and to thereby apply said amplified control voltage to the anode of said second discharge system to vary the frequency of said source in a direction suppressing said variations in frequency of said intermediate frequency wave from said given frequency.

5. A superheterodyne receiver circuit arrangement, comprising a first electron discharge system having input and output circuit means, means to apply a received signal wave to the input circuit means of said first discharge system, a second electron discharge system having input and output circuit means, a resistance element interposed in both the output circuit means of said first and second discharge systems, means intercoupling the output and input circuit means of said second discharge system in regenerative relationship to produce a source of local oscillation, said output circuit means of said second discharge system comprising a frequency determining circuit having a variable reactance element, said source undergoing changes in the frequency thereof proportional to changes in potential applied to the said output circuit means of said second discharge system, means to apply said local oscillation to the input circuit means of said first discharge system to mix said received signal wave and said local oscillation thereby to produce in the output circuit means of said first discharge system an intermediate frequency wave having a given frequency, a detector stage responsive to said intermediate frequency wave coupled to said output circuit means of said first electron discharge system, means to derive from said detector stage a direct control voltage proportional to variations in frequency of said intermediate frequency wave from said given frequency, means to apply said control voltage to the input circuit means of said first discharge system to produce across said resistance element an amplified control voltage and to thereby apply said amplified control voltage to the output circuit means of said second discharge system to vary the frequency of said source in a direction suppressing said variations in frequency of said intermediate frequency wave from said given frequency, a mechanical control member responsive to an applied potential, means to apply said control voltage to said control member, and means to intercouple said control member and said variable reactance element to vary the reactance of said variable reactance element upon variations in said control voltage thereby to vary the frequency of said source in a direction further suppressing said variations in frequency of said intermediate frequency wave from said given frequency.

6. A superheterodyne receiver circuit arrangement, comprising a first electron discharge system having input and output circuit means, means to apply a received signal wave comprising a single side band signal having a pilot frequency modulation component to the input circuit means of said first discharge system, a second electron discharge system having input and output circuit means, a resistance element interposed in both the output circuit means of said first and second discharge systems, means intercoupling the output and input circuit means of said second discharge system in regenerative relationship to produce a source of local oscillation, said source undergoing changes in the frequency thereof proportional to changes in potential applied to the said output circuit means thereof, means to apply said local oscillation to the input circuit means of said first discharge system to mix said received signal wave and said local oscillation thereby to produce in the output circuit means of said first discharge system an intermediate frequency wave having a given central frequency and a given intermediate frequency modulation component corresponding to said pilot frequency component, a frequency detector stage responsive to said intermediate frequency wave coupled to said output circuit means of said first electron discharge system, means to derive from said frequency detector a direct control voltage proportional to variations in frequency of said intermediate frequency modulation component from said given intermediate frequency modulation component, means to apply said control voltage to the input circuit of said first discharge system to produce across said resistance element an amplified control voltage and to thereby apply said amplified control voltage to the output circuit of said second discharge system to vary the frequency of said source in a direction suppressing said variations in frequency of said intermediate frequency modulation component from said given intermediate frequency modulation component.

JACOBUS LUDOVICUS ARENDS.

REFERENCES CITED

The following references are of record in the file of this patent:

UNITED STATES PATENTS

| Number | Name | Date |
|---|---|---|
| 2,404,568 | Dow | July 23, 1946 |
| 2,404,852 | Koch | July 30, 1946 |
| 2,434,293 | Stearns | Jan. 13, 1948 |
| 2,475,074 | Bradley et al. | July 5, 1949 |
| 2,513,786 | Crosby | July 4, 1950 |